P. B. KENNEDY & E. L. MORROW.
COMBINED LAND AND WATER VEHICLE.
APPLICATION FILED JAN. 16, 1917.
1,289,808.
Patented Dec. 31, 1918.
3 SHEETS—SHEET 3.
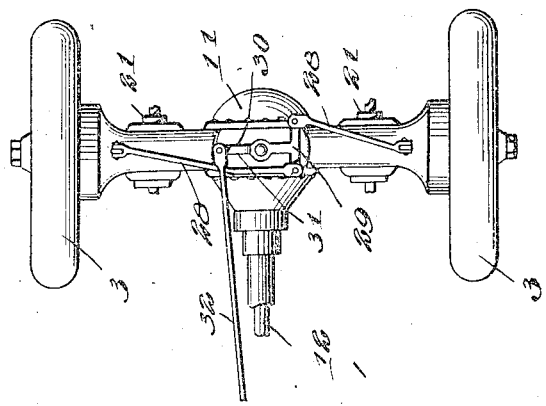
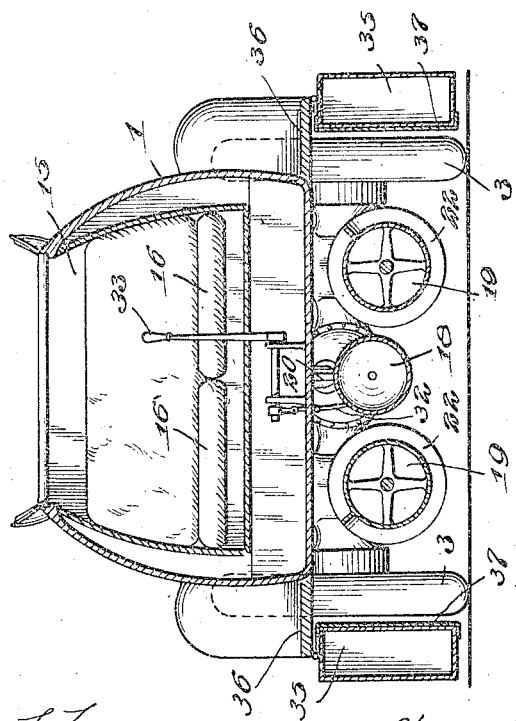
Witnesses.
Frederick L. Fox,
C. C. Hines.
Inventor
P. B. Kennedy,
E. L. Morrow.
By Victor J. Evans
Attorney

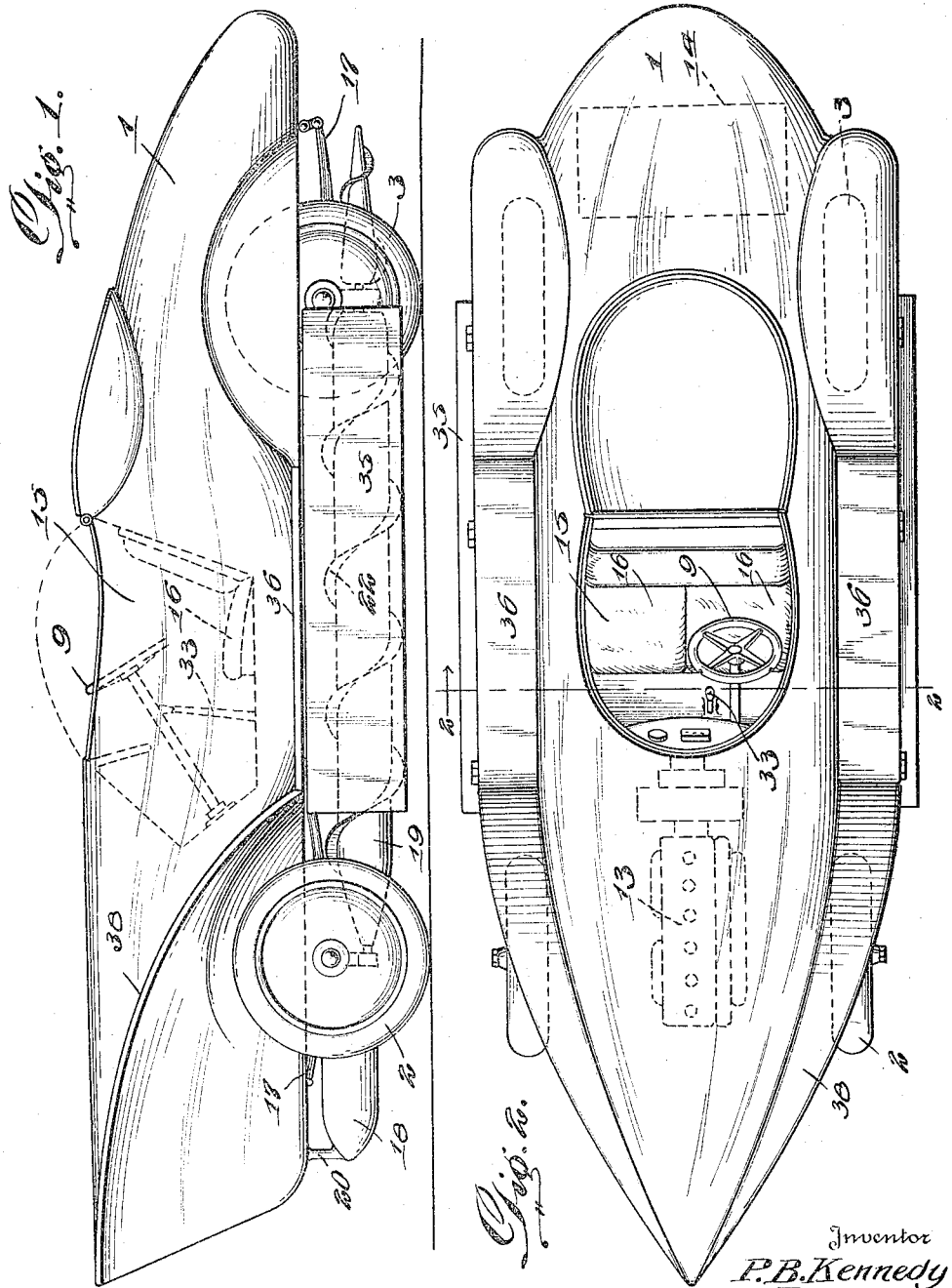

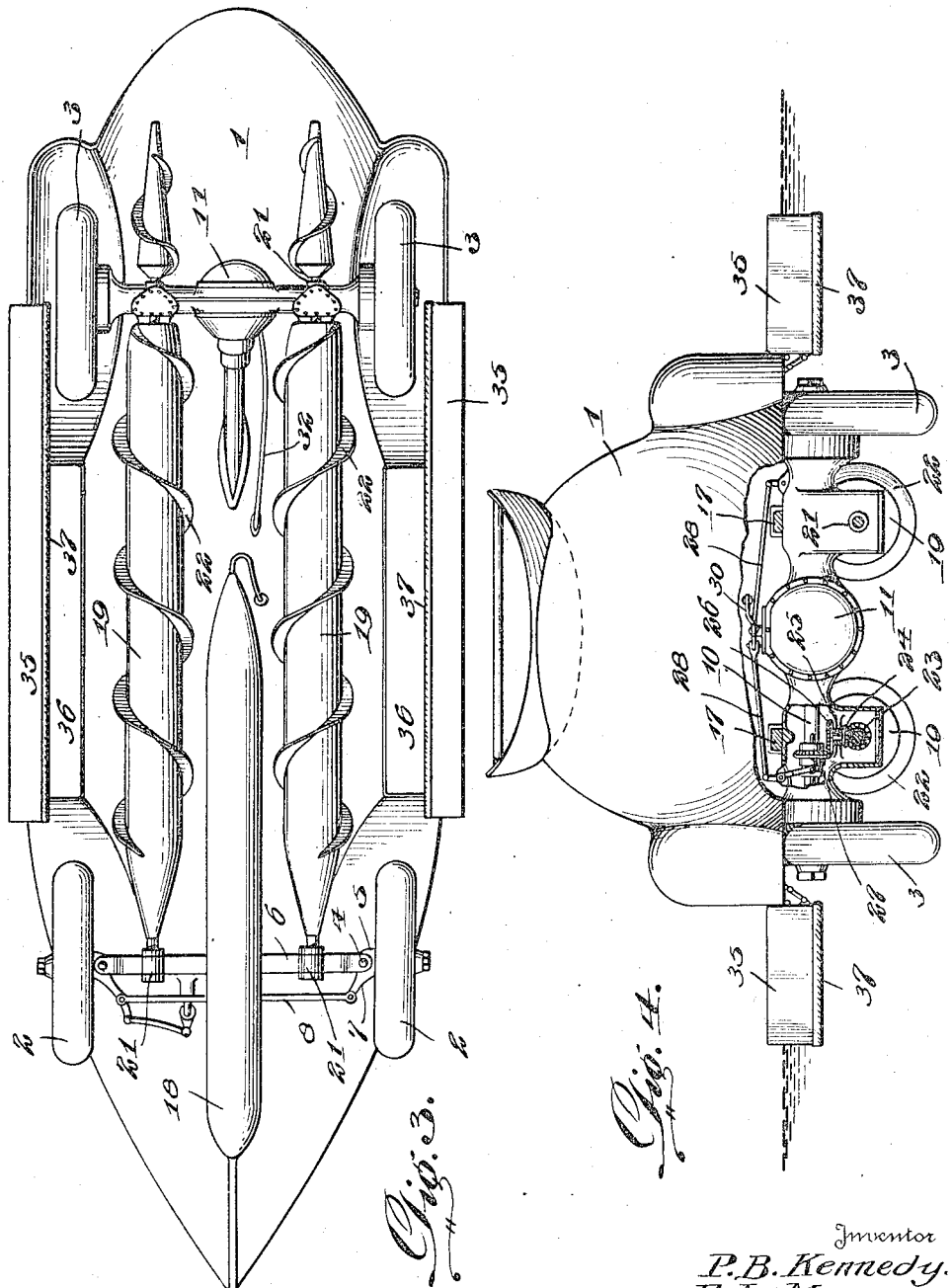

UNITED STATES PATENT OFFICE.

PETER B. KENNEDY AND ELMER L. MORROW, OF SANTA BARBARA, CALIFORNIA; SAID MORROW ASSIGNOR TO SAID KENNEDY.

COMBINED LAND AND WATER VEHICLE.

1,289,808.

Specification of Letters Patent.   Patented Dec. 31, 1918.

Application filed January 16, 1917.   Serial No. 142,699.

*To all whom it may concern:*

Be it known that we, PETER B. KENNEDY and ELMER L. MORROW, citizens of the United States, residing at Santa Barbara, in the county of Santa Barbara and State of California, have invented new and useful Improvements in Combined Land and Water Vehicles, of which the following is a specification.

This invention relates to improvements in vehicles adapted for travel on both land and water, and has for its primary object to provide a vehicle of this character embodying a hydrobase or bottom flotation surfaces, including folding floats and revoluble floats, which are respectively provided to automatically come into operation when the vehicle is submerged in water and to be driven so as to serve as propellers, whereby the vehicle may be sustained upon and propelled along the surface of a body of water.

A further object of the invention is to provide a vehicle of the character described in which the folding floats, which are attached to the running boards of the vehicle, are adapted to fold to an inoperative position when the vehicle is traveling upon land and to float to an operative position when the vehicle enters the water, thus obviating the necessity of employing means for manually throwing the folding floats into and out of action.

A still further object of the invention is to provide a hydrobase including a stationary forward central pontoon and longitudinally extending side pontoons having propelling surfaces, which side pontoons are adapted to be driven from the running gear of the vehicle, whereby the vehicle is adapted to be effectually supported upon a body of water and driven with considerable speed.

The invention consists of the features of construction, combination and arrangement of parts hereinafter fully described and claimed, reference being had to the accompanying drawings in which:—

Figure 1 is a side elevation of a combined land and water vehicle embodying our invention.

Fig. 2 is a top plan view of the same.

Fig. 3 is a bottom plan view.

Fig. 4 is a rear elevation with parts in section.

Fig. 5 is a vertical transverse section on line 5—5 of Fig. 2.

Fig. 6 is a detail view of the clutch mechanism for throwing the revoluble pontoons into and out of action.

In carrying our invention into practice, we provide a vehicle body 1, which is preferably cigar-shaped, and is provided with front supporting and steering wheels 2 and rear supporting and driving wheels 3, which may be of the pneumatic-tired type. The wheels 2 are journaled to rotate upon spindles 4 carried by steering knuckles 5 journaled upon a stationary transverse front axle 6, said knuckles having the crank arms 7 coupled by a connecting rod 8. This connecting rod is adapted to be actuated from a suitable type of control gear, including a control device 9, which control gear may be of the ordinary automobile type, whereby the front wheels may be simultaneously turned for a steering action. The wheels 3 are mounted upon a transverse rear shaft composed of divided sections 10 which may be associated with an ordinary type of differential gearing 11 actuated from a driving shaft 12. This shaft 12 may be driven in the usual manner from any preferred type of transmission gearing driven from a motor 13 disposed in the forward portion of the body 1, which motor may be supplied with gasolene or other fuel from a tank 14 contained in the rear portion of the body. The car 1 may be made of aluminum or other suitable material which is light in weight and yet possesses strength and durability and is provided centrally with a cock pit or space 15 to accommodate suitable seats 16 and the steering and controlling gear.

The body 1 is supported upon the land running gear of the vehicle by suitable springs 17 and is provided upon its underside with a hydrobase comprising a central forward stationary pontoon 18 and longitudinal side pontoons 19. Each of these pontoons comprises an elongated hollow body, preferably provided with tapered or conoidal ends, and which may be filled with compressed air, gas or any other suitable buoyant medium. The central pontoon 18 is fixed in position by suitable supports 20, while the side pontoons are journaled for rotation in bearings 21 and are provided with spiral propelling blades 22 adapted when the said pontoons 19 are rotated to drive the vehicle through the water.

The side pontoons are provided with beveled gears 23 which mesh with beveled gears 24 on the lower ends of vertical shafts 25, which shafts 25 are provided at their upper ends with gears 26 meshing with gears 27 on the rear axle sections 10, whereby said pontoons are driven. The gears 27 are loosely mounted on the axle sections 10 and are adapted to be fixed thereto by clutch members 27 connected with actuating rods 28 which are coupled to a pair of angularly disposed arms 29 on a lever 30, whereby on reverse movements of said lever the two clutches will be simultaneously thrown into or out of action. The lever 30 is provided with a third arm 31, coupled by a connecting rod 32 to a suitable control device 33 disposed within the vehicle body, so that the driver or operator may throw the propeller pontoons into and out of action at will. By this means it will be understood that when the vehicle is traveling on land the propeller pontoons will be thrown out of operation, while when the vehicle is traveling in water the propeller pontoons will be thrown into action by the clutch mechanism to propel the vehicle.

In practice, the central forward pontoon may be either mounted directly upon the vehicle body or upon a suitable part of the chassis or frame carrying the axles and gear housings. The pontoons form a hydrobase which is designed to entirely or substantially support the weight of the vehicle in a body of water but in order to secure increased flotation efficiency I preferably provide folding side floats 35. These floats 35 consist of boards or platforms which are hinged at their inner or normally upper edges to the running boards 36 of the vehicle and have their opposite edges free, each float being preferably provided upon its inner or underside with an inflatable body 37 which may be filled with air or gas having buoyant properties. The folding floats are adapted to swing by gravity to a vertical position when the vehicle is traveling upon land, so as to dispose the bodies 37 beneath the running boards 36, and are adapted to float upward to the level of the running boards when the vehicle enters the water to provide side extension floats, thus increasing the flotation area of the vehicle and adapting it to ride with ease and comfort even in very rough water, it being understood that the folding floats when extended or swung outward to an operative position will also serve as fenders to prevent the water from splashing into the body of the vehicle.

In order to protect the running boards and floats from the action of the water and to decrease the resistance of the vehicle to travel through the water we provide the forward end of the vehicle body with a V-shaped prow consisting of rearwardly diverging curved plates 38, which meet at their forward edges at the bow of the body 1 and extend rearwardly therefrom on opposite sides of the body to a point just in advance of the running boards and folding floats, thus adapting the vehicle to cut cleanly through the water and sweep the water aside and beyond the line of the running boards, to diminish the resistance of the running boards to travel. These plates 38 further serve as fenders to prevent the waves from dashing too violently over upon the body of the vehicle in rough water.

It will be evident from the foregoing description, that the invention provides a type of vehicle which is adapted to travel with ease and facility upon both land and water, and which when arranged for water travel will be properly supported upon the surface of the water and may be driven at considerable speed by the revolution of the propeller pontoons. In the travel of the vehicle in water the front supporting and steering wheels may be employed for steering purposes, or other suitable steering means may be used, and it will be evident that in making a turn the pontoons will be driven at different speeds to facilitate turning by the action of the differential gearing. It will, of course, be understood that the parts may be made comparatively light in weight, with proper strength and durability, by the use of aluminum alloys and other light and strong materials.

We claim:—

1. A vehicle of the character described including a body, a frame provided with running wheels on which the body is flexibly suspended, gearing on said frame for driving said wheels, a motor upon the body for driving said gearing, rotatable propeller floats upon the body driven by the gearing, and means flexibly connecting said floats with the body and frame.

2. A vehicle of the character described including a wheeled frame having a driving axle, a body flexibly supported upon said frame, gearing upon the frame for driving said driving axle, a motor upon the body for driving said gearing, rotatable propeller pontoons flexibly jointed to the frame and body, gearing for driving said pontoons from the first-named gearing, and means for throwing the pontoon driving gearing into and out of action.

3. A vehicle of the character described including a frame provided with running wheels, a body supported upon said frame, a central float upon the underside of the body, gearing upon the frame for driving the running wheels, longitudinally extending side floats flexibly connected with and revolubly mounted on the frame and body, gearing for driving said revoluble floats from the first-named gearing, means for throwing the float driving gearing into and out of action, and a motor for driving the first-named gearing, said motor being mounted upon the body of the vehicle.

4. In a vehicle of the character described, a body provided with running boards, floats hinged to the running boards, and a prow upon the body comprising rearwardly diverging plates extending rearwardly to positions adjacent to the forward ends of the running boards and floats.

In testimony whereof we affix our signatures.

PETER B. KENNEDY.
ELMER L. MORROW.

Copies of this patent may be obtained for five cents each, by addressing the "Commissioner of Patents, Washington, D. C."